March 9, 1965 V. FLAX 3,172,933
METHOD OF MANUFACTURING THERMOPLASTIC TUBES
Filed Nov. 14, 1960 3 Sheets-Sheet 1
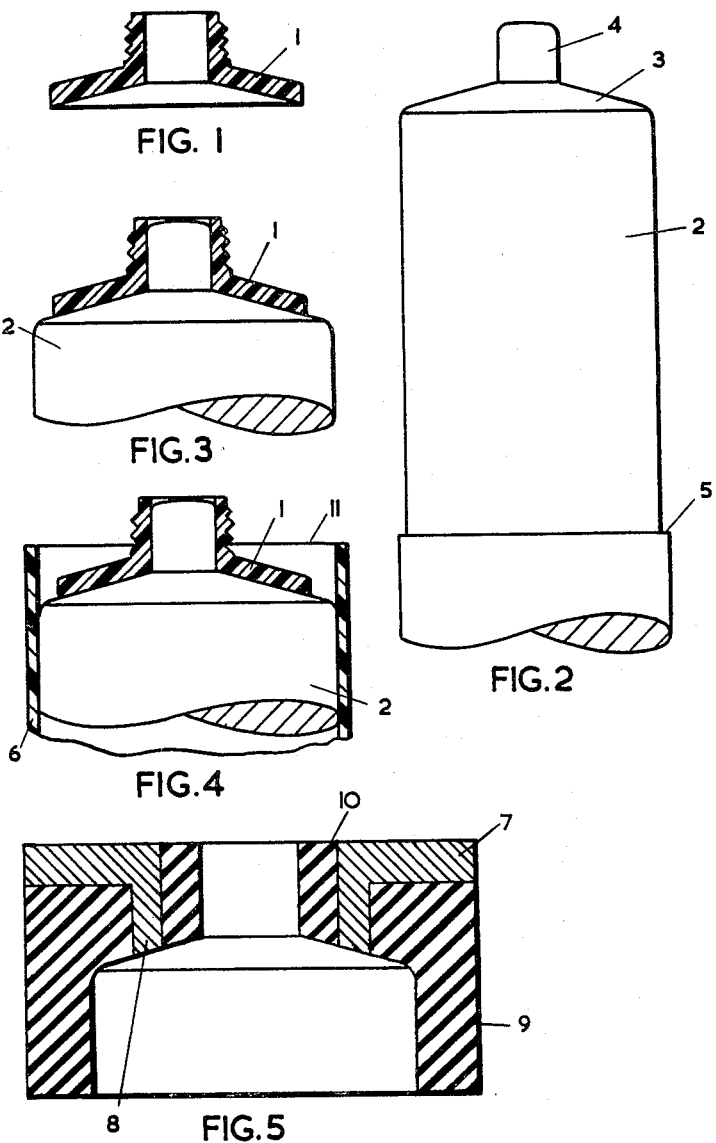
INVENTOR
Valer Flax
ATTORNEYS March 9, 1965  V. FLAX  3,172,933
METHOD OF MANUFACTURING THERMOPLASTIC TUBES
Filed Nov. 14, 1960  3 Sheets-Sheet 2

INVENTOR
Valer Flax
By *[signature]*
ATTORNEYS

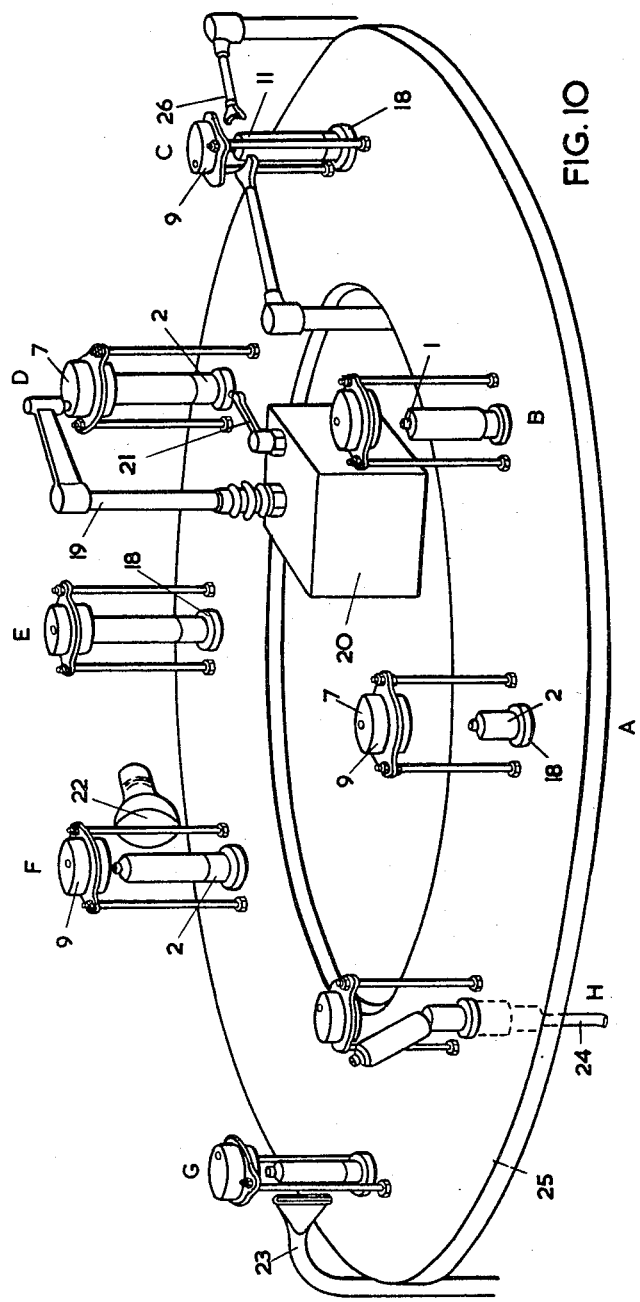

3,172,933
METHOD OF MANUFACTURING THERMOPLASTIC TUBES

Valer Flax, Vic-Fezensac, Gers, France
Filed Nov. 14, 1960, Ser. No. 68,756
Claims priority, application France, Nov. 18, 1959,
4,574, Patent 1,241,073
6 Claims. (Cl. 264—248)

This invention relates to the manufacture of containers of thermoplastic material of the kind comprising a tubular body terminating at one end in an end-piece, which may be and generally is shaped to constitute a delivery nozzle.

The invention comprises an improved method of manufacturing such a container by welding together a preformed tubular body and a preformed end-piece.

In one manner of carrying the invention into practice, the upper end portion of the wall of the tubular body is bent inwardly so as to overlie the peripheral portion of the end-piece and is welded to the latter over an annular area having a diameter smaller than that of the container, the operations of turning the body wall down on to the end-piece and of welding them together being carried out in a single operation and with the same pair of tools. The tubular container so produced has a smooth continuous outer surface, the cylindrical portion of the surface being entirely free from roughness and irregularities.

The tools used in so carrying out the invention consist on the one hand of a metal former or core, having a cylindrical portion which fits within the tubular body and a top portion shaped to correspond with the internal shape of the previously formed end-piece, and on the other hand of a hood or mould which comprises a metal part constituting an annular welding tool and a ring of non-metallic material surrounding the welding ring. A second member of non-metallic material is preferably disposed inside the welding ring. The welding surface of the metal ring and the adjacent interior surfaces of the non-metallic member or members are continuous with one another and together constitute a continuous mould surface, whose shape corresponds to that which it is desired to give to the completed container.

In operation, the preformed end-member is positioned on the top of the core and the tubular body is positioned around the core with its top edge projecting. The core and mould are then moved axially together so that the outer ring of non-metallic material in the mould engages and turns down the top edge of the body. To facilitate such bending, this edge portion of the body is previously softened by heating, but the heating operation should be confined to the top edge of the body, the remainder being required to remain at a lower temperature. After the edge of the body has been turned down, it is embedded by compression in the peripheral zone of the end-piece, which becomes soft under the action of heat and pressure during the welding operation, which is preferably carried out by means of high-frequency electric currents, the cylindrical former and the metal ring of the covering mould serving as electrodes. The initial external diameter of the end-piece is preferably substantially less than that of the core, the pressure applied during the welding operation to the peripheral zone of the end-piece causing this zone to thin out and increase in diameter, so as to underlie the turned over edge of the tubular body, to which it becomes integrally united by welding.

In an alternative manner of carrying the invention into practice a preformed end-piece is welded to a tubular body element without any turning over of the wall of the body. The end-piece again has initially an external diameter substantially smaller than the internal diameter of the tubular element and is supported on top of a core which fits within the tubular body, but in this case the body projects beyond the core only by the thickness of the end-piece. The hood or mould consists of a central metal part shaped internally to conform to the end-piece and surrounded by a ring of dielectric, or other suitable non-metallic, material projecting downwardly therefrom, the internal diameter of the projecting part being equal to the external diameter of the tubular body element. During the welding operation, the heating to which the end-piece is subjected (either by high-frequency currents passing between the electrodes constituted by the central metal part of the hood and the core, or by any other system) in conjunction with the pressure exerted on it by the core and the mould, will cause a thinning down of the annular peripheral zone of the end-piece, increasing the diameter thereof until it touches the wall of the tubular body element and causing the welding of the end-piece to the body.

The tools described may be operated manually, or may form part of a machine which allows all the operations to be carried out automatically. In the latter case, each manufacturing unit comprises a cylindrical core and its hood or mould, the core being movable in an axial direction, while the mould is stationary and disposed in axial alignment with the core. The previouly moulded end-piece is placed on the core when the latter is in its lowest position. During its ascending travel, the core engages within the tube intended to form the body of the container, this tube being located by a shoulder provided on the core in such manner that the top edge of the tube projects beyond the core. After the edge of the body has been heated, the core, continuing its movement, causes the end-piece and the tube to engage inside the hood, turning over the edge of the tube and welding it to the end-piece. The core is maintained in this position for a sufficient time to allow the welded portion to solidify. The core then descends to its original position and a jet of compressed air introduced through a passage in the core ejects the finished container. When the modified manner of operation is employed, the prior heating of the edge of the tubular element is unnecessary, and there is no turning down of said edge, all the other operations remaining as just described.

For a fuller understanding of the invention reference may be made to the folowing description and the accompanying drawings, which description and drawings are intended by way of illustration and example and are in no way limitative. In the drawings:

FIGURE 1 shows an axial section through a preformed end-piece;

FIGURE 2 shows a side view of a core tool;

FIGURE 3 shows the core with the end-piece placed on its end;

FIGURE 4 illustrates the core carrying the end-piece and with a tubular body member in position around it;

FIGURE 5 is a view in section of the hood or mould;

FIGURE 10 is a perspective view of parts of a machine for an assembly of eight carrying out automatically the operations required to manufacture the containers.

Figure 6:
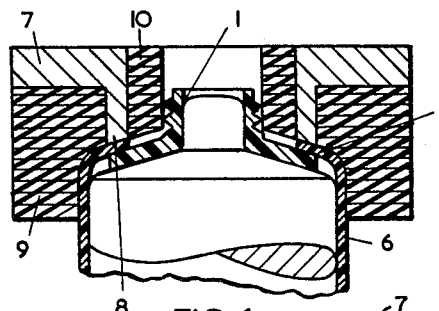
FIGURE 6 is an axial section showing the position of the parts during the operation of turning the edge of the tubular body down on to the end-piece.

Referring first to the particular embodiment of the invention illustrated by FIGURES 1 to 7 of the drawings, the end-piece 1, shown separately in FIGURE 1, has the form of a slightly coned disc having its centre a tubular outlet nozzle which is externally threaded. It is, however, possible to use an end-piece of any other desired form. FIGURE 2 shows a cylindrical core tool 2 having at its upper end a conical portion 3 and a cylindrical portion 4, shaped and dimensioned to fit within the end-piece 1, while the cylindrical part of the core is a close fit within the tubular container body, this tubular element being located by resting with its lower edge upon the shoulder 5 of the core. FIGURE 3 shows the core 2 supporting the end-piece 1 and FIGURE 4 shows the core 2 with the end-piece 1, disposed within a tubular body element 6, whose top edge 11 projects beyond the core. FIGURE 5 shows the hood or mould, comprising a metal disc 7, from which there projects downwardly an annular flange or ring 8 serving as a welding electrode. To this disc there is secured an outer ring member 9 made of dielectric material. A second ring 10 of dielectric material may be disposed inside the ring 8, as shown, but this is not essential. The internal shape of the mould assembly 7, 8, 9, 10 corresponds to the external shape of the container which it is desired to make and the mould surface is smooth and continuous.

Figure 7:
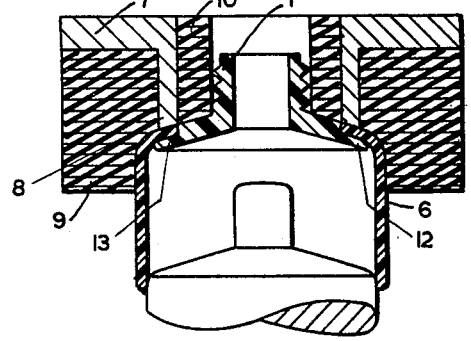
FIGURE 7 shows the same assembly after completion of the welding operation.

FIGURE 6 shows the respective positions of the end-piece 1, the tubular element 6, the cylindrical core 2, and the hood or mould constituted by parts 7, 8, 9 and 10, after the core has been moved sufficiently close to the mould to effect turning down of the top edge 11 of the tubular element 6. It should be noted that the external diameter of the end-piece 1 is smaller than the internal diameter of the tubular element 6 and that the inner ring 10 serves to receive the tubular nozzle of the end-piece and ensure that the latter is correctly centred. FIGURE 7, which illustrates the same assembly as that shown in FIGURE 6 after welding has been effected, shows the embedding of the turned down edge 11 of the body in the peripheral zone 12 of the end-piece, this zone 12 having been thinned out by pressure, thus increasing its diameter. The end-piece is now welded to the tubular body over the annular zone 13 opposite the electrode ring 8.

Figure 8:
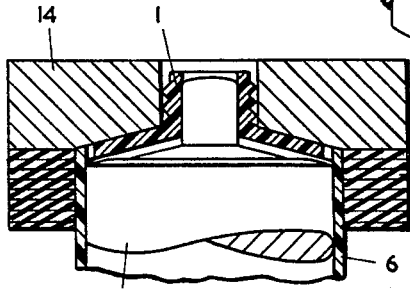
FIGURES 8 and 9 are views corresponding to FIGURES 6 and 7 but illustrating a modified manner of operation.
Figure 9:
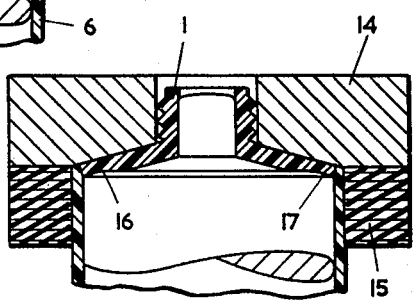

FIGURE 8 shows a modified pair of tools about to make a weld between an end-piece 1 and a tubular element 6 without turning down the edges of the body tube. It will be noted that the external diameter of the end-piece is distinctly smaller than the internal diameter of the tubular element. The core tool 2 is similar to that of the previous example, while the hood or mould is composed of a metal part 14 and a non-metallic or dielectric part 15. FIGURE 9 shows the same assembly after welding. In this figure there will be seen at 16 the annular zone where the end-piece is thinned out and extruded radially, its edge becoming welded at 17 to the inner surface of the wall of the tubular element.

FIGURE 10 shows an automatically operating apparatus in which a plurality of pairs of the tools described are mounted on a rotating device 25. The particular apparatus illustrated has eight working stations (distinguished by the letters A to G), at each of which there is a cylindrical core member 2, adapted to move axially in a guide 18 (the required movement being obtained by any known means, such as cams, levers, hydraulic or pneumatic jacks, electromagnets or any other suitable means) and a fixed welding hood, which is supported above and in axial alignment with the core 2.

At station A, the core 2 is in its lowermost position to permit the loading on to it (either automatically or manually) of an end-piece and tubular body member. At station B the core rises until shoulder 5 engages and lifts the lower edge of the body. At station C the top edge 11 of the body is heated by means 26 (infra-red rays, hot air, electric resistances or other suitable means). At station D the core 2, continuing its ascending travel, causes the end-piece and the tubular element to engage in the hood to effect the operations of turning down the edge 11 and welding it on to the end-piece 1.

In the apparatus illustrated the welding is carried out by means of high-frequency electric current and at station D the metal part 7 of the hood comes into contact with a conductor 19 carrying high-frequency current produced by a generator 20, the core member 2 making contact with a second conductor 21. At station E, the core remains in raised position, so that the pressure between the parts to be welded is maintaiend for sufficient time to permit the end of the tubular container thus formed to assume permanently the shape of the mould. At station F, the tubular body is reheated to cause it to resume the cylidrical shape of the core, the heating action being obtained by means of an infra-red ray lamp 22, or any other source of heat. At station G, the entire assembly is cooled by a stream of cool air issuing from a blowing nozzle 23 and, finally, at station H, the core returns to its lowest position and is placed in communication with the compressed-air conduit 24, the compressed air flowing through a hole drilled through the core 2 and ejecting the finished tubular container. The table 25 supporting the eight pairs of tools may be driven either with a continuous circular motion or with a discontinuous motion, according to what is appropriate for carrying out the manufacturing cycle.

As will be obvious to those skilled in the art, the invention is by no means limited to the particular ways of carrying it into effect which have been more particularly described above. On the contrary, it comprises all those modifications which can be devised within the true spirit and essence of the present invention.

I claim:

1. A method of manufacturing a tubular container which comprises the steps of locating and supporting a tubular body element of thermoplastic material on the exterior of a core tool, supporting a preformed end piece of thermoplastic material having a smaller diameter than said body element on the end face of said core within one end portion of said body element, subjecting the peripheral zone of said end piece to heat and compressing it axially against the end face of the core tool, whereby said zone is reduced in thickness, increased in diameter, pressed against said body element and welded thereto, and subsequently separating said core tool and body element.

2. A method in accordance with claim 1 wherein the end piece is located within the end of the body element with the wall of the body projecting beyond the periphery of the end piece and prior to the said application of heat and pressure, the projecting part of the body wall is turned inwardly to overlie the said peripheral zone of the end piece, and wherein the said inturned portion is welded to the said zone upon the said application of heat and pressure.

3. A method in accordance with claim 2, including the step of heating the end portion of the wall of the tubular body so as to soften this portion prior to turning it in over the peripheral zone of the end-piece.

4. A method in accordance with claim 1 wherein the end piece is located within the end portion of the body element with the edge of the wall level with the outer face of the end piece and only the edge of the peripheral zone is caused to be welded to the wall of the body element.

5. A method of manufacturing a tubular container from a tubular body element of thermo-plastic material and a preformed end piece of thermoplastic material, said end piece having a centrally exposed discharge nozzle and an annular peripheral zone surrounding said nozzle, and being of smaller diameter than the interior of said body element, said method comprising the steps of supporting the said end piece upon an end face of a core tool, supporting the said body element upon the exterior of said core tool with the wall of said body element projecting beyond the periphery of said end piece, turning inwardly the projecting portion of said wall to overlie said peripheral zone, generating heat in said inturned portion and in said peripheral zone, and axially compressing said inturned portion and said peripheral zone together against the end face of said core tool, whereby said zone is decreased in thickness and increased in diameter and is welded to said inturned portion of said body element.

6. A method of manufacturing a tubular container from a tubular body element of thermo-plastic material and a preformed end piece of thermoplastic material, said end piece having a centrally exposed discharge nozzle and an annular peripheral zone surrounding said nozzle, the end piece being of smaller diameter than the interior of said body element, said method comprising the steps of supporting the said end piece upon an end face of a core tool, supporting the said body element upon the exterior of said core tool with the edge of the wall of said body element level with the outer face of said end piece, generating heat in said peripheral zone, and axially compressing said peripheral zone against the end face of the core tool, whereby said zone is reduced in thickness, increased in diameter and has its edge pressed against the body element and welded thereto.

References Cited by the Examiner
UNITED STATES PATENTS

| | | | |
|---|---|---|---|
| 2,383,230 | 8/45 | Voke | 154—83 |
| 2,413,323 | 12/46 | Hills. | |
| 2,478,267 | 8/49 | Hickler | 154—83 |
| 2,678,471 | 5/54 | Barton | 156—69 XR |
| 2,710,986 | 6/55 | Gray | 156—69 XR |
| 2,738,827 | 3/56 | Roll | 154—42 |
| 2,752,739 | 7/56 | Doenhoff | 264—259 |
| 2,760,551 | 8/56 | Downey et al. | 154—42 |
| 2,958,906 | 11/60 | Youthed | 156—294 XR |
| 3,074,837 | 1/63 | Flax. | |
| 3,128,504 | 4/64 | Gewecke | 264—248 |

ROBERT F. WHITE, *Primary Examiner.*

CARL F. KRAFFT, EARL M. BERGERT,
ALEXANDER H. BRODMERKEL, *Examiners.*